United States Patent [19]
Fusco et al.

[11] Patent Number: 5,589,015
[45] Date of Patent: Dec. 31, 1996

[54] METHOD AND SYSTEM FOR INSERTING REINFORCING ELEMENTS IN A COMPOSITE STRUCTURE

[75] Inventors: Thomas M. Fusco, Medford; Constance Magee, Wilmington; Glenn Freitas, Foxboro, all of Mass.

[73] Assignee: Foster-Miller, Inc., Waltham, Mass.

[21] Appl. No.: 600,473

[22] Filed: Feb. 13, 1996

Related U.S. Application Data

[63] Continuation of Ser. No. 254,987, Jun. 7, 1994, abandoned.

[51] Int. Cl.$^6$ .............................. B32B 7/08; B32B 31/16
[52] U.S. Cl. ..................... 156/73.1; 156/92; 156/303.1; 156/580.1; 264/443; 264/277; 425/174.2
[58] Field of Search .................... 156/73.1, 73.2, 156/91, 92, 303.1, 580.1, 580.2; 264/442, 443, 445, 277; 228/1.1, 110.1; 425/174.2

[56] References Cited

U.S. PATENT DOCUMENTS

| | | | |
|---|---|---|---|
| 3,184,353 | 5/1965 | Balamuth et al. | 156/92 X |
| 3,440,117 | 4/1969 | Soloff et al. | 156/92 X |
| 4,808,461 | 2/1989 | Boyce et al. | 428/119 |
| 5,021,107 | 6/1991 | Holko | 156/89 |
| 5,186,776 | 2/1993 | Boyce et al. | 156/73.2 |

*Primary Examiner*—James Sells
*Attorney, Agent, or Firm*—Iandiorio & Teska

[57] ABSTRACT

A method of and system for inserting reinforcing pins in a composite structure in which a number of reinforcing pins are inserted in a compressible material; the compressible material/pin combination is assembled on the composite structure; ultrasonic energy is applied to the pins; and pressure is applied simultaneously with the application of ultrasonic energy to compress the compressible material and insert the pins into the composite structure to join two laminates or reinforce a single composite structure.

13 Claims, 2 Drawing Sheets

METHOD AND SYSTEM FOR INSERTING REINFORCING ELEMENTS IN A COMPOSITE STRUCTURE

This is a continuation of application Ser. No. 08/254,987, filed Jun. 7, 1994, now abandoned.

FIELD OF INVENTION

This invention relates to a method and system for inserting reinforcing elements in a composite structure using ultrasonic energy and pressure.

BACKGROUND OF INVENTION

Composites are used because of their high strength to weight ratio. Fastening composite parts, however, is often troublesome. For example, in attaching an aircraft structural skin member to a supporting stringer, bolts and/or rivets may be used, but such fasteners add weight, increase fabrication costs, and can contribute to local failure modes between the plies of the laminate composite. Brazing is also used to join two composite parts, (see U.S. Pat. No. 5,021,107), but does not always provide sufficient strength to maintain the integrity of the joint between the two composites under load.

It was discovered by the applicant that composite structures can be reinforced to prevent delamination and cracking by inserting pins such as boron fibers through the thickness of the composite. The pins are inserted into a thermally decompressable foam body which is then placed on the composite. The application of increased temperature and pressure in an autoclave drives the pins through the thickness of the composite. See, U.S. Pat. No. 4,808,461.

Recently, it was realized by the applicant that the pins can be driven through two composite structures to join them, and that such a structure joined by pins extending through both laminates was stronger than one made by brazing alone and offered significant benefits over rivets or bolts used as fasteners. See, U.S. patent application Ser. No. 08/056,029, and U.S. Pat. No. 5,186,776.

Still, the state of the art lacks a convenient methodology for inserting pins to join composite structures like the skin/stringer arrangement of an aircraft wing since such structures cannot be conveniently placed in an autoclave.

SUMMARY OF INVENTION

It is therefore an object of this invention to provide an improved method and system for inserting reinforcing pins into a composite material.

It is a further object of this invention to provide such a method and system for inserting reinforcing pins into a composite structure that eliminates the need to use an autoclave and the need for the increased temperatures used in an autoclave.

It is a further object of this invention to provide such a method and system for inserting reinforcing pins into a composite structure which can be used to join one composite laminate to another composite laminate and to form a joint therebetween without the need for brazing or rivets or bolt-type fasteners.

It is a further object of this invention to provide such a method and system of inserting reinforcing pins into a composite structure to reinforce the composite structure.

It is a further object of this invention to provide such a method and system for inserting reinforcing pins into a composite structure which lowers fabrication costs and does not contribute to local failure modes.

This invention results from the realization that ultrasonic energy, in addition to pressure, can be used to conveniently insert pins into a composite structure thereby eliminating the need for external sources of increased temperatures and pressures such as an autoclave. This invention results from the further realization that the pins are heated by the ultrasonic energy and can therefore be driven easily into a composite structure without degrading the individual plies of the composite and also that the composite melts in a localized area about the pins during insertion which further promotes a strong joint between two composite structures. The method and the system of this invention may be used to join two composite parts and/or to reinforce one composite part.

This invention features and may suitably comprise, include, consist essentially of, and/or consist of a method and system for inserting reinforcing pins in a composite structure. The method comprises inserting a number of reinforcing pins in a compressible material; assembling the compressible material/pin combination on the composite structure; imparting ultrasonic energy to the pins; and simultaneously applying pressure to the compressible material to compress the same and insert the pins into the composite structure.

Assembling the compressible material/pin combination on a composite structure includes placing the compressible material/pin combination about a joint region between two or more laminate structures for joining them. Assembling the compressible material/pin combination on a composite structure also includes placing the compressible material/pin combination on a laminate structure for reinforcing the laminate structure. The composite structure may be a cured fiber matrix structure; or the composite structure may be an uncured fiber matrix structure.

The method further includes adding a screening layer to at least one side of the compressible material to maintain the reinforcing pins in their proper orientation therein during the application of pressure to the compressible material.

The system for inserting reinforcing pins into a composite structure of this invention comprises a number of reinforcing pins inserted in a compressible material; means for applying ultrasonic energy to the pins; means for applying pressure to the pins simultaneously with the application of ultrasonic energy for compressing the compressible material and driving the pins into the composite structure.

The composite structure comprises at least two laminate structures to be joined or a laminate structure to be reinforced. The composite structure includes a cured fiber matrix structure or uncured fiber matrix structure.

The compressible material may include a screening material on at least one side thereof for maintaining the reinforcing pins in their proper orientation upon application of pressure to the compressible material.

DISCLOSURE OF PREFERRED EMBODIMENT

Other objects, features and advantages will occur to those skilled in the art from the following description of a preferred embodiment and the accompanying drawings, in which.

Figure 1:
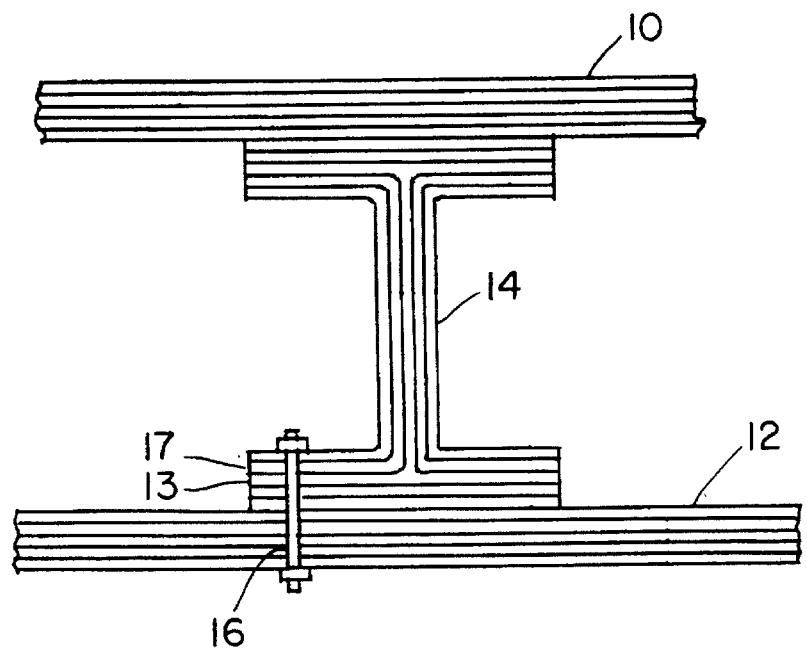
FIG. 1 is a schematic cross-sectional diagram of two laminates structurally reinforced by a stringer typical of an aircraft wing section.

FIG. 1 shows laminates 10 and 12 structurally reinforced by stringer 14 as is common in aircraft wing sections. As discussed in the Background in the Invention above, using bolts or rivet type fasteners as shown at 16 to join laminate 12 to stringer 14 adds weight, increases fabrication costs, and can contribute to failure modes at the laminate/stringer interface or even between the plies 13, 17, of the laminate. On the other hand, it is not practical to use an autoclave to insert pins through laminate 12 and stringer 14 as discussed in U.S. Pat. No. 4,808,461 in all applications.

Figure 2A:
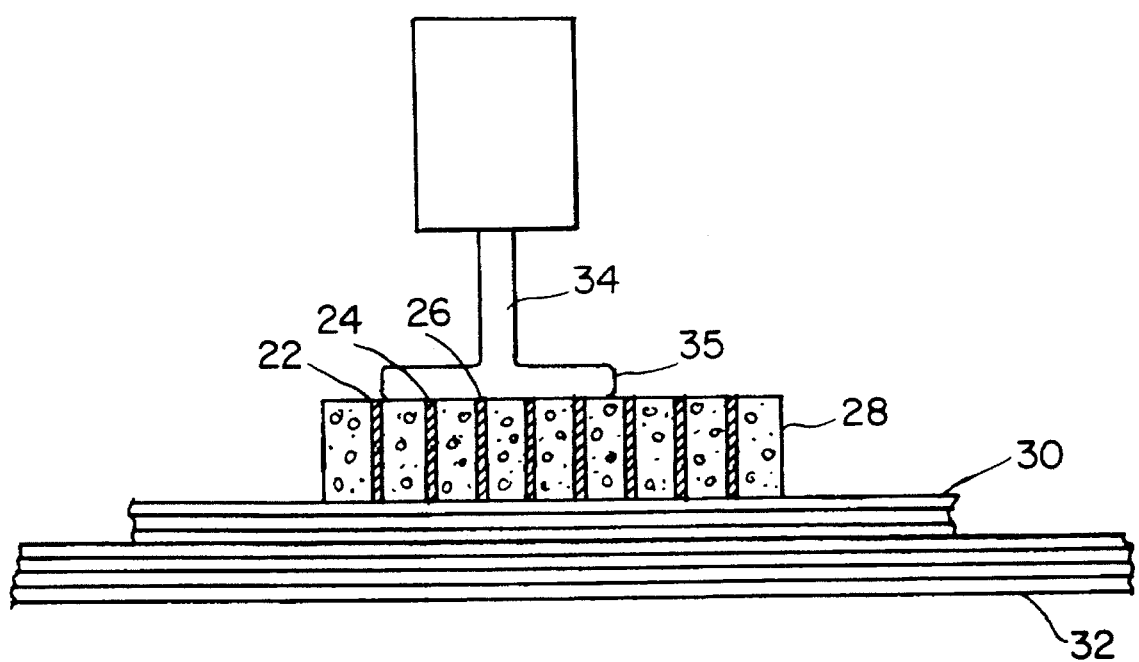
FIGS. 2A–2C are schematic cross-sectional diagrams showing the method and the system used for inserting reinforcing pins through the thickness of two laminates.
Figure 2B:
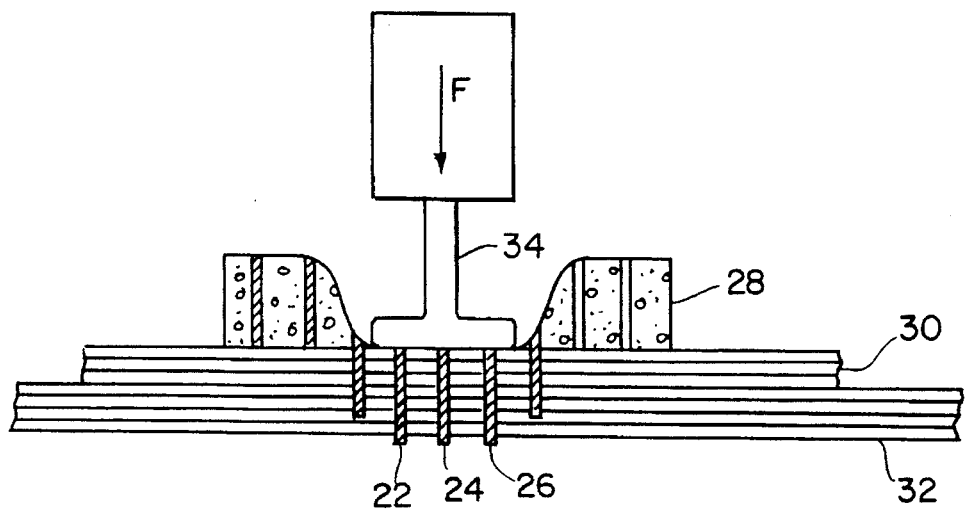
Figure 2C:
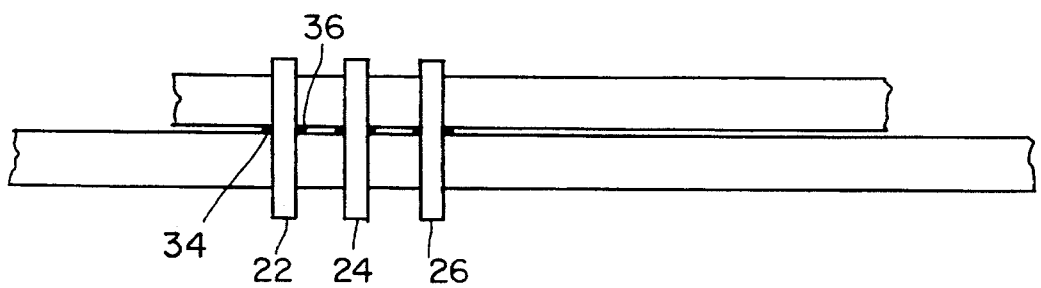

In this invention, a number of pins 20, 22, 24, FIG. 2A, are first inserted into foam body 28 and then the foam body/pin combination is assembled on laminate 30 which is to be joined with laminate 32. Ultrasonic transducer 34 is then used to impart ultrasonic energy to pins 22, 24, and 26 while at the same time pressure as depicted by force F, FIG. 2B, is applied to compress foam body 28 and to drive pins 22, 24, and 26 through the thickness dimension of laminates 30 and 32 as shown without degrading the individual plies of each laminate. Foam body 28 conveniently maintains the pins in their proper orientation during the step of applying ultrasonic energy and pressure. The use of ultrasonic energy also causes localized melting as shown at 34 and 36, FIG. 2C, about pin 22, which further facilitates a strong bond between laminate 30 and laminate 32.

In this way, laminate 30 is joined to laminate 32 (or laminates 10 and 12 are joined to stringer 14, FIG. 1) without the need for bolt or rivet type fasteners and without any degradation of the individual plies of the laminate.

Figure 3:
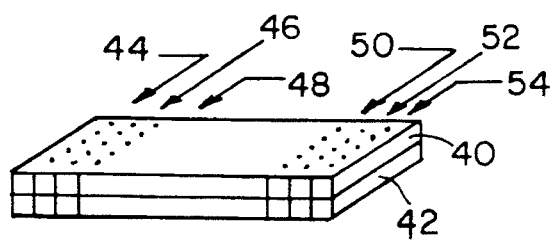
FIG. 3 is a schematic three-dimensional view of reinforcing pins inserted according to the method of FIGS. 2A–2C shown forming a joint between two laminates.

Two composites are shown in FIG. 3 (after the pins are filed flush) joined by rows of pins 44, 46, 48 at one end and rows of pins 50, 52, 54 at the other end as shown using ultrasonic energy and pressure according to the method described above with reference to FIGS. 2A–2C.

Figure 4:
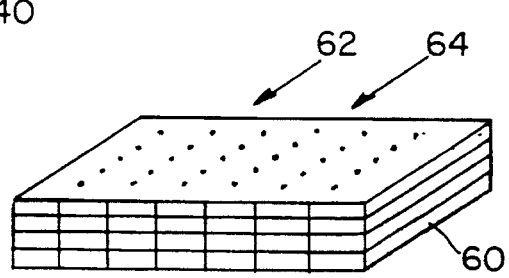
FIG. 4 is a schematic three dimensional view of pins inserted into a single laminate for reinforcing of the individual plies of the laminate.

Also, a single laminate 60, FIG. 4, can be reinforced by inserting rows of pins 62, 64, as shown thereby achieving z-direction reinforcement of laminate 60 as described in U.S. Pat. No. 4,808,461, but without the need to use an autoclave.

Body 28, FIG. 2A maybe a substance compressible under pressure including an elastomeric material such as RTV silicon rubber, FIBER FORM™ graphite insulation, KAWOOL™ ceramic insulation, phenolic based foam, fiber glass, and polyamide based insulation, melamine, Rohacell™, Polymathacrylimide™, Diveneycell™, cross linked polyvinyl, and Klegecell™ based rigid polyvinyl chlorides, foams, PVC (polyvinyl chloride), polyesters, polyethylenes, polypropolenes, polyurethanes, polystyrenes, polymides, cellulose, acetates, silicones, polybenzimidazoles, polyvinyls, PEEK, polyetherkeytone, PPS, polyphelonlynesulfide, carbon and graphite.

Reinforcing pins 22, 24, 26, may be aluminum, boron, carbon, graphite, Kevlar, stainless steel, titanium, tungsten, glass, silicon carbide, aluminum oxide, aluminum nitrate, rigid phenolics, rigid polymides, rigid epoxy, thermoplastics, and composites of such materials. Reinforcing pins 22, 24, and 26 are inserted into foam body 28 by means of a numerical control machine or other means known to those skilled in the art. An array of rods or fibers or pins 22, 24, 26 each about 0.1 mm in diameter are disposed in body 28 with a spacing between fibers of about 1.5 mm. The diameter, length, and spacing of the pins will depend on the geometry of the composite structure to be reinforced or the joint to be made.

Laminates 30, 32, may be a fiber matrix structure formed of fibers in a resin matrix already cured, fibers in an uncured resin combined as a prepeg, preform material of fibrous material and a tackifier or even raw fiber matting which has yet to be impregnated. The resin used to secure the individual plies of the fiber matrix structure may be epoxy polymides, bismaleimides, phenolics, polycyanurate, PEEK, polyetherkeytone, PPS, polyphenolsulfide, AVAMID, polymides, polyester, and vinylesters.

If required, for fiber matrix laminate structures with curved profiles, compressible foam body 28 maybe thermoformed to match the contours of the composite structure to be joined or reinforced. Ultrasonic transducer 34, FIG. 2A is a model TW2 available from Branson powered by a modle E150 Branson power supply. Ultrasonic transducer 34 was placed in a drill press over foam body 28 after a length of Scotch Tape was used to secure the foam body/pin combination about laminates 30 and 32. The ultrasonic transducer was then energized to a frequency of 20 KHZ and brought down to bear on the foam body using the drill press with an applied pressure estimated to be about 20–30 ft.lb. The area of tip 35 of horn 34 was modified to be 0.5" wide by 0.435" long and used to insert about four pins at a time. The power and weld times can be varied to suit the specific application. In experimentation, it was found that 75% power and a 2.0 sec weld time resulted in adequate performance in inserting stainless steel or similar pins in preforms, and composites.

The result is a joined composite structure and/or a reinforced composite structure fabricated without the need to use an autoclave and increased temperatures, and without the limitations inherent in using conventional fasteners such as bolts or rivets.

Figure 5:
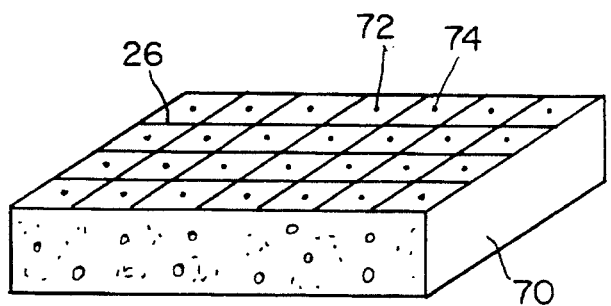
FIG. 5 is a schematic three dimensional view of a foam body/pin combination with a layer of screening material added for maintaining the orientation of the pins during the application of the ultrasonic horn of this information.

When the array of pins 72, in foam body 70, FIG. 5 become somewhat dense, there is the possibility that the pins may degrade the structure of the foam body and the foam body will not support the pins in their proper alignment during the application of the ultrasonic transducer under pressure. Accordingly, in one embodiment of this invention, screening layer 76 is placed on foam body 70 and the pins 72, 74 are inserted at the interstices of the screening layer 76 as shown. In this way, the screening layer maintains the pins in their proper orientation during the application of pressure. There may also be another screening layer on the opposite side of the foam body (not shown).

Although specific features of the invention are shown in some drawings and not others, this is for convenience only as some features may be combined with any or all of the other features in accordance with the invention.

Other embodiments will occur to those skilled in the art and are within the following claims:

What is claimed is:

1. A method of inserting reinforcing pins in a composite structure, the method comprising:

inserting a number of reinforcing pins in a compressible material to form a compressible material/pin combination structure;

assembling said compressible material/pin combination structure on a composite structure which includes plies of fibers in a resin matrix;

imparting ultrasonic energy to a plurality of said pins at the same time; and simultaneously applying pressure to said compressible material and said plurality of pins to compress the compressible material and insert said plurality of pins into the composite structure in unison.

2. The method of claim 1 in which assembling the compressible material/pin combination on a composite structure includes placing said compressible material/pin combination about a joint region between two or more laminate structures for joining the laminate structures.

3. The method of claim 1 in which assembling said compressible material/pin combination on a composite structure includes placing said compressible material/pin combination on a laminate structure for reinforcing the laminate structure.

4. The method of claim 1 in which said composite structure includes a cured fiber matrix structure.

5. The method of claim 1 in which said composite structure includes an uncured fiber matrix structure.

6. The method of claim 1 further including adding a screening layer to at least one side of said compressible material to maintain said reinforcing pins in their proper orientation therein during the application of pressure to the compressible material.

7. A system for inserting reinforcing pins into a composite structure, the system comprising:

a compressible material having a number of reinforcing pins disposed therein;

an ultrasonic device for applying ultrasonic energy to a plurality said pins at the same time;

means for applying pressure to said plurality of pins simultaneously with the application of ultrasonic energy for compressing said compressible material and driving said plurality of pins in unison into a composite structure which includes plies of fibers in a resin matrix.

8. The system of claim 7 in which said composite structure comprises at least two laminate structures to be joined.

9. The system of claim 7 in which said composite structure comprises a laminate structure to be reinforced.

10. The system of claim 7 in which said composite structure includes a cured fiber matrix structure.

11. The system of claim 7 in which said composite structure includes an uncured fiber matrix structure.

12. The system of claim 7 in which said compressible material includes a screening material on at least one side thereof for maintaining said reinforcing pins in their proper orientation upon application of pressure to said compressible material.

13. A method of inserting reinforcing pins in a composite structure, the method comprising:

inserting a number of reinforcing pins in a compressible material thereby forming a reinforcing pin/compressible material structure which maintains a spacing between pins and alignment of the pins;

assembling the reinforcing pin/compressible material structure on a composite structure to be reinforced, said composite structure including plies of fibers in a resin matrix;

bringing an ultrasonic horn to bear on a plurality of said pins imparting ultrasonic energy to said plurality of pins and simultaneously applying pressure via said horn to said plurality of pins and said compressible material to drive the plurality of pins into the composite structure as the compressible material is compressed.

* * * * *